Figure 1:
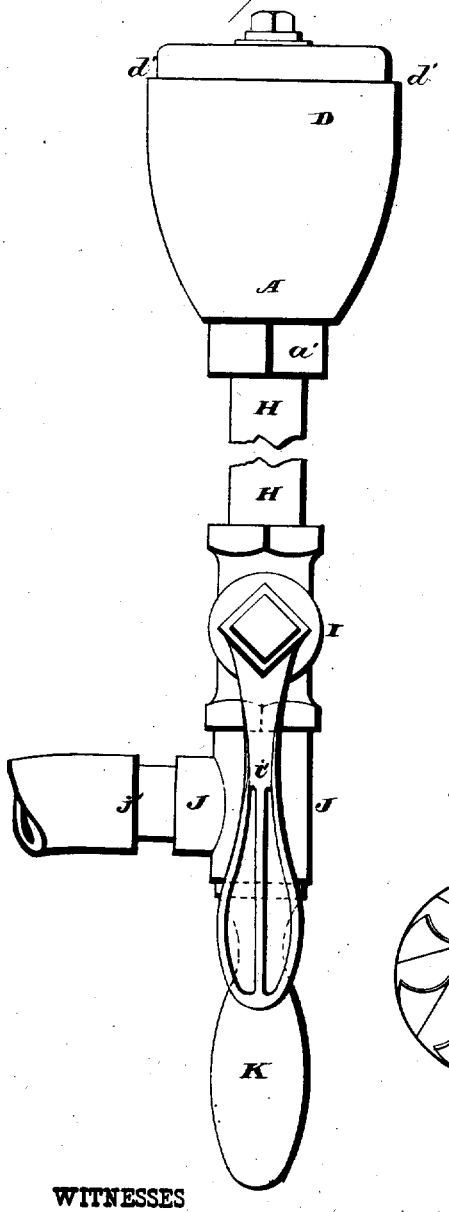

R. ATHERTON,

Assignor, by mesne assignments, of part interest to W. HAGUE & H. RIDGWAY.

Steam-Flue Cleaner.

No. 9,136. Reissued Mar. 30, 1880.

WITNESSES

E. J. Nottingham

F. O. McCleary.

INVENTOR

Robert Atherton.

By H. A. Symon.

ATTORNEY

UNITED STATES PATENT OFFICE.

ROBERT ATHERTON, OF PATERSON, NEW JERSEY, ASSIGNOR, BY MESNE ASSIGNMENTS, OF PART OF HIS INTEREST TO WILL PAGUE AND HENRY RIDGWAY, OF SAME PLACE.

STEAM FLUE-CLEANER.

SPECIFICATION forming part of Reissued Letters Patent No. 9,136, dated March 30, 1880.

Original No. 210,833, dated December 17, 1878. Application for reissue filed February 17, 1880.

*To all whom it may concern:*

Be it known that I, ROBERT ATHERTON, of the city of Paterson, in the county of Passaic and State of New Jersey, have invented a new and useful Improvement in Steam Flue-Cleaners, of which the following is a specification.

My invention relates to an improvement in steam flue-cleaners, the object being to provide a light and portable apparatus which shall be simple and durable in its construction and of small initial cost, and adapted to be readily connected with the steam-space of a steam-boiler by a flexible tube, and cause the current of steam passing through the apparatus to be subdivided into any desired number of steam-jets, which describe sharp spirals in passing through the flues or tubes, and thus subject the entire inner surface of the flues to the action of the several thin spiral steam-jets, and thereby rapidly remove all soot, dirt, or other accumulations adhering to or deposited upon the interior surfaces of the flues.

My invention consists, first, in a flue-cleaner provided with a rotary fan or wheel provided with spirally-set blades or wings, forming contracted steam-exit passages or openings between the outer end of the casing and said rotary fan or wheel, whereby steam, being admitted to the apparatus, impinges upon the spiral blades or wings and rapidly rotates the fan or wheel, and thereby causes the steam to escape into the flues in any desired number of thin sheets, which have a spiral movement imparted thereto by the action of the rotary fan or wheel.

My invention further consists in a steam flue-cleaner consisting, essentially, of a casing subdivided by a perforated partition into a steam-chamber and a fan or wheel case and a rotary fan or wheel furnished with spirally-set blades or wings journaled in the outer chamber or fan-wheel case.

My invention further consists in the combination, with a rotary fan-wheel provided with spiral blades or wings, of a casing or chamber and steam-passages located to cause the steam to impinge against the spiral blades of the fan-wheel and rotate the same.

My invention further consists, in a steam flue-cleaner, in the combination, with a chamber or casing adapted to fit the outer end of a tube or flue, of a revolving fan-wheel journaled within said casing, said fan-wheel provided with an oil-chamber for lubricating its bearing, substantially as set forth.

My invention further consists in the combination, with a steam-chamber, of a rotary fan-wheel provided with spiral blades and a removable spindle, on which the fan-wheel is journaled.

My invention further consists in the several other details of construction and combinations of parts, as will hereinafter be described, and pointed out in the claims.

Figure 2:
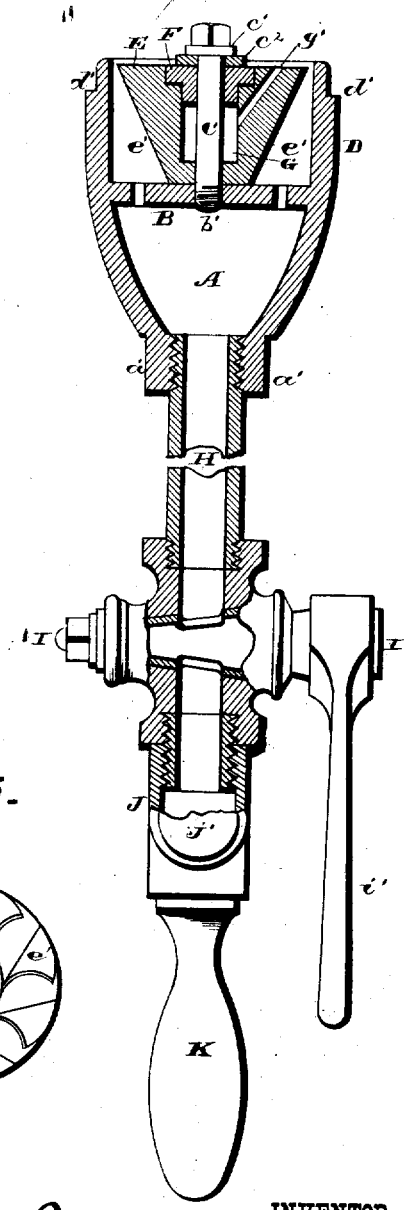
Figure 3:
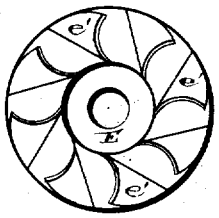

In the accompanying drawings, Figure 1 is a plan view of my improved steam flue-cleaner. Fig. 2 is a longitudinal section of the same; and Fig. 3 is a reverse-plan view of the fan-wheel.

A is the steam-chamber. *a'* is the inlet to the same. B is the perforated partition (dividing the steam-chamber from the fan-case) through which the steam passes. *b'* is a hole in the center of the partition B, which is tapped out for the reception of the spindle C. D is the fan-case, the outside edge of which is turned to allow the same to be easily inserted into the end of the flue, leaving a beading or shoulder, *d'*, which, coming in contact with the end of the flue, allows the machine to be firmly held in its place, at the same time keeping the flue almost steam-tight, thereby preventing any waste of force.

E is a conical fan with blades or wings *e'*, set spirally. The center of the cone E is bored out at one end, so as to revolve easily on the spindle C, and at the other end is as much larger as may be desired.

In the larger end is fitted a bush, F, the inside diameter of which corresponds with the diameter of the small hole, said bush being made the desired length and securely fitted in the cone E, and forms a recess, G, in the center of the cone E, which serves as a reservoir for oil or any other lubricant which is supplied through the oil-hole *g'* in the face or front of the cone E.

The spindle C has a thread cut on one end, and near the other end is a shoulder or collar, *c'*, between which and the face or front of the conical fan E is inserted a loose washer, $c^2$, which relieves the collar $c'$ on the spindle C. Outside of the collar $c'$ on the spindle C is left a square, so that the spindle C may be readily tightened or loosened by means of a wrench.

H is the extension-pipe, which may be of any desirable length for the convenient working of the machine, one end of which is securely screwed into the inlet $a'$ of the steam-chamber A, and the other end is screwed into one end of the stop-cock I. In the other end of the stop-cock I is screwed one end of the T-connection J, and in the other end of the T-connection J is securely screwed the handle K, leaving the remaining opening in the T-connection J for the attachment $j$ to be properly connected with the boiler.

With this construction the small end of the fan-case D is inserted into the end of the flue with the beading or shoulder $d'$ firmly held against the extreme end of the flue, when, the proper connections having been made with the boiler, the steam rushes into the rubber tube and attachment $j$, T-connection J, and stop-cock I.

When the handle $i'$ of the stop-cock I is turned the steam enters the extension-pipe H, passing into the steam-chamber A, through the holes or perforations in partition B, to the fan-case D, and, coming in contact with the conical fan E and spirally-set blades or wings $e'$, causes the same to revolve at a rapid speed on the spindle C, and the steam which escapes through the opening between the outside of the conical fan E and the inside of the fan-case D by the action of the swiftly-revolving conical fan E rushes into the flue with an expanded spiral and rotary force, causing the dirt in the flue to revolve with increasing speed until forced out at the opposite end, thereby preventing any dirt from falling to the bottom of the flue while being cleaned. The steam is then turned off by reversing the handle $i'$ of the stop-cock I, and the operation is speedily performed on the succeeding flue.

Having fully described my invention, what I claim as new, and desire to secure by Letters Patent, is—

1. A flue-cleaner provided with a rotary fan or wheel provided with spiral blades or wings, said fan or wheel located within a casing and forming contracted steam-exit passages, through which steam flows into the tubes or flues in thin spiral jets, substantially as set forth.

In a steam flue-cleaner, the combination, with a casing having a perforated partition, of a rotary fan or wheel provided with spiral blades or wings, substantially as set forth.

3. In a steam flue-cleaner, the combination, with a rotary fan-wheel provided with spiral blades or wings, of a casing or chamber provided with steam-passages located to cause the steam to impinge against the spiral blades or wings, substantially as set forth.

4. In a steam flue-cleaner, the combination, with a chamber or casing adapted to fit the outer end of a tube or flue, of a rotary fan-wheel journaled in the outer end of said chamber, said rotary fan-wheel provided with spiral blades or wings, substantially as set forth.

5. In a steam flue-cleaner, the combination of a casing and a rotary fan-wheel provided with spiral blades located therein, said fan-wheel provided with an oil-chamber for lubricating its bearing, substantially as set forth.

6. In a steam flue-cleaner, the combination, with a casing and a rotary fan-wheel provided with spiral blades located therein, of a removable spindle on which the fan-wheel is journaled, substantially as set forth.

7. In a steam flue-cleaner, the combination, with a casing, of a rotary fan-wheel provided with spiral blades or wings, the outer end of said fan-wheel provided with a recess, and a spindle, one end of which is secured to a partition in said casing, substantially as set forth.

8. In a steam flue-cleaner, the combination, with a tube or pipe for conducting steam to the discharging-exits, of a T-connection, one end of which is screwed to the tube, the opposite end having a handle connected therewith, and a flexible pipe or tube attached to the other arm, substantially as set forth.

9. In a steam flue-cleaner, the combination, with a steam-chamber, of a tapering steam-distributer provided with spiral blades or wings on its tapered portion, substantially as set forth.

10. In a steam flue-cleaner, the combination, with the casing forming a steam-chamber, of a tapering or conical steam-distributer provided with spiral wings or blades on its tapering portion, the latter located to deflect and subdivide the volume of steam into separate spiral jets, substantially as set forth.

In testimony that I claim the foregoing I have hereunto set my hand and seal this 10th day of February, 1880.

ROBERT ATHERTON. [L. S.]

Witnesses:

T. VAN IDERSTIN

J. M. OATMAN.